(12) United States Patent
Mittal et al.

(10) Patent No.: US 10,577,994 B2
(45) Date of Patent: Mar. 3, 2020

(54) CONTROL OF MULTIPLE REDUCTANT INSERTION ASSEMBLIES USING A SINGLE CONTROLLER

(71) Applicant: Cummins Emission Solutions Inc., Columbus, IN (US)

(72) Inventors: Aditya Mittal, Columbus, IN (US); Aditya Hegde, Columbus, IN (US); Deepu Chandy, Columbus, IN (US); Guinness Shrestha, Columbus, IN (US); Venkata SriKiran Bodapati, Greenwood, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 191 days.

(21) Appl. No.: 15/190,882

(22) Filed: Jun. 23, 2016

(65) Prior Publication Data

US 2016/0376965 A1 Dec. 29, 2016

Related U.S. Application Data

(60) Provisional application No. 62/184,019, filed on Jun. 24, 2015.

(51) Int. Cl.
*F01N 3/20* (2006.01)
*F01N 9/00* (2006.01)
*F01N 13/00* (2010.01)

(52) U.S. Cl.
CPC .............. *F01N 3/208* (2013.01); *F01N 9/00* (2013.01); *F01N 13/011* (2014.06);
(Continued)

(58) Field of Classification Search
CPC .......... F01N 13/011; F01N 3/208; F01N 9/00; F01N 2240/16; F01N 2610/02;
(Continued)

(56) References Cited

U.S. PATENT DOCUMENTS 6,538,345 B1 * 3/2003 Maller ................... H02J 9/061
307/64
7,178,328 B2 * 2/2007 Solbrig .................. B01D 53/90
60/286
(Continued)

FOREIGN PATENT DOCUMENTS

KR      10-1399049      5/2014

OTHER PUBLICATIONS

First Office Action issued for U.S. Appl. No. 15/755,292, dated Jul. 25, 2019, 23 pages.
(Continued)

*Primary Examiner* — Brandon D Lee
(74) *Attorney, Agent, or Firm* — Foley & Lardner LLP

(57) ABSTRACT

An aftertreatment system comprises a first bank to receive a first portion of an exhaust gas and a second bank to receive a second portion of the exhaust gas. A first reductant insertion assembly is fluidly coupled to the first bank and a parent controller is communicatively coupled thereto. A second reductant insertion assembly is fluidly coupled to the second bank and a first child controller is communicatively coupled thereto. A third reductant insertion assembly is fluidly coupled to the first bank and a second child controller is communicatively coupled thereto. The parent controller instructs the first reductant insertion assembly to insert reductant into the first bank. The parent controller also instructs the first child controller to command the second reductant insertion assembly to insert reductant into the second bank, and instructs the second child controller to command the third reductant insertion assembly to insert reductant into the first bank.

21 Claims, 10 Drawing Sheets

(52) U.S. Cl.
CPC ...... *F01N 2240/16* (2013.01); *F01N 2610/02* (2013.01); *F01N 2610/10* (2013.01); *F01N 2900/1404* (2013.01); *F01N 2900/1406* (2013.01); *Y02T 10/24* (2013.01); *Y02T 10/47* (2013.01)

(58) Field of Classification Search
CPC ......... F01N 2610/10; F01N 2900/1404; F01N 2900/1406; Y02T 10/24; Y02T 10/47
See application file for complete search history.

(56) References Cited

U.S. PATENT DOCUMENTS

| | | | |
|---|---|---|---|
| 7,254,212 B2 | 8/2007 | Saitoh et al. | |
| 7,485,272 B2 | 2/2009 | Driscoll et al. | |
| 7,549,317 B2 | 6/2009 | Rhodes et al. | |
| 7,739,898 B2 | 6/2010 | Shaddock et al. | |
| 7,963,143 B2 | 6/2011 | Baumann et al. | |
| 8,030,086 B2 | 10/2011 | Schmidt et al. | |
| 8,161,796 B2 | 4/2012 | Nair et al. | |
| 8,249,827 B2 | 8/2012 | Nelson et al. | |
| 8,249,872 B2 | 8/2012 | Aronowitz et al. | |
| 8,256,307 B2 | 9/2012 | Graze et al. | |
| 8,490,465 B2 | 7/2013 | Ante et al. | |
| 2006/0049346 A1 | 3/2006 | McGann et al. | |
| 2009/0035195 A1* | 2/2009 | Robel | F01N 3/0231 422/177 |
| 2011/0314796 A1 | 12/2011 | Nakamura et al. | |
| 2012/0047875 A1* | 3/2012 | Hamama | F01N 9/00 60/274 |
| 2012/0186227 A1 | 7/2012 | Yacoub et al. | |
| 2014/0360168 A1* | 12/2014 | Broderick | F01N 3/208 60/274 |
| 2015/0093315 A1* | 4/2015 | Broderick | F01N 3/208 423/239.1 |
| 2016/0160725 A1* | 6/2016 | Hudgens | F01N 3/2066 60/274 |
| 2016/0223432 A1 | 8/2016 | Kubinski | |

OTHER PUBLICATIONS

International Search Report and Written Opinion for PCT/US2015/047243, dated Nov. 23, 2015, 10 pages.

* cited by examiner

CONTROL OF MULTIPLE REDUCTANT INSERTION ASSEMBLIES USING A SINGLE CONTROLLER

CROSS-REFERENCE TO RELATED APPLICATIONS

This application claims priority to and draws benefit from U.S. Provisional Patent Application No. 62/184,019, filed Jun. 24, 2015, and entitled "Control of Multiple Reductant Insertion Assemblies using a Single Controller," the entire disclosure of which is incorporated herein by reference.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$).

In order to meet increasingly strict NOx emission requirements and regulations, the concentration of the NOx gas in the exhaust gas emerging from the SCR system is stringently measured and controlled to stay within the emission requirements. Some engines produce very large quantities of exhaust gas. Aftertreatment systems associated with such large engines often include multiple banks, branches or conduits. The exhaust gas is divided into smaller portions directed through each bank. Furthermore, multiple reductant insertions assemblies, including a number of injectors and or pumps are provided on each bank to inject large quantities of reductant into each bank to facilitate decomposition of constituents of the exhaust gas by the aftertreatment system. Multiple controllers are also included in such aftertreatment systems for controlling individual reductant insertion assemblies. However, this increases the complexity of the system, can lead to slow response to variable operating conditions of the aftertreatment system and eventually lead to increased emissions.

SUMMARY

Embodiments described herein relate generally to systems and methods for controlling multiple reductant insertion assemblies included in an aftertreatment system. In various implementations, systems and methods described herein relate to aftertreatment systems including a parent controller and a plurality of child controllers each of which is operative to activate one or more reductant insertion assemblies. The parent controller is communicatively coupled to the plurality of child controllers and configured to control the operation of each of the one or more reductant insertion assemblies via the plurality of child controllers.

In a first set of embodiments, an aftertreatment system comprises a first bank configured to receive a first portion of an exhaust gas produced by an engine, and a second bank configured to receive a second portion of the exhaust gas. A first reductant insertion assembly is fluidly coupled to the first bank. A parent controller is communicatively coupled to the first reductant insertion assembly. A second reductant insertion assembly is fluidly coupled to the second bank. A first child controller is communicatively coupled to the second reductant insertion assembly. A third reductant insertion assembly is fluidly coupled to the first bank. A second child controller is communicatively coupled to the third reductant insertion assembly. The parent controller is configured to instruct the first reductant insertion assembly to insert a reductant into the first bank. The parent controller is also configured to instruct the first child controller to command the second reductant insertion assembly to insert the reductant into the second bank, and to instruct the second child controller to command the third reductant insertion assembly to insert the reductant into the first bank.

In another set of embodiments, an aftertreatment system comprises a first bank configured to receive a first portion of an exhaust gas produced by an engine, and a second bank configured to receive a second portion of the exhaust gas produced by the engine. A first reductant insertion assembly is fluidly coupled to the first bank. A second reductant insertion assembly is fluidly coupled to the second bank. A controller is communicatively coupled to the first reductant insertion assembly and the second reductant insertion assembly. The controller is configured to instruct the first reductant insertion assembly to insert a reductant into the first bank, and instruct the second reductant insertion assembly to insert the reductant into the second bank.

In yet another set of embodiments, a control circuitry for controlling insertion of a reductant into an aftertreatment system which comprises a first bank configured to receive a first portion of an exhaust gas produced by an engine, a second bank configured to receive a second portion of the exhaust gas produced by the engine, and a plurality of reductant insertion assemblies coupled to the first bank and the second bank, comprises a parent controller. The parent controller is structured to be communicatively coupled to a first reductant insertion assembly of the plurality of reductant insertion assemblies fluidly coupled to the first bank. A first child controller is structured to be communicatively coupled to a second reductant insertion assembly of the plurality of reductant insertion assemblies fluidly coupled to the second bank. A second child controller is structured to be communicatively coupled to a third reductant insertion assembly of the plurality of reductant insertion assemblies fluidly coupled to the first bank. The parent controller is configured to instruct the first reductant insertion assembly to insert a reductant into the first bank, instruct the first child controller to command the second reductant insertion assembly to insert the reductant into the second bank, and instruct the second child controller to command the third reductant insertion assembly to insert the reductant into the first bank.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
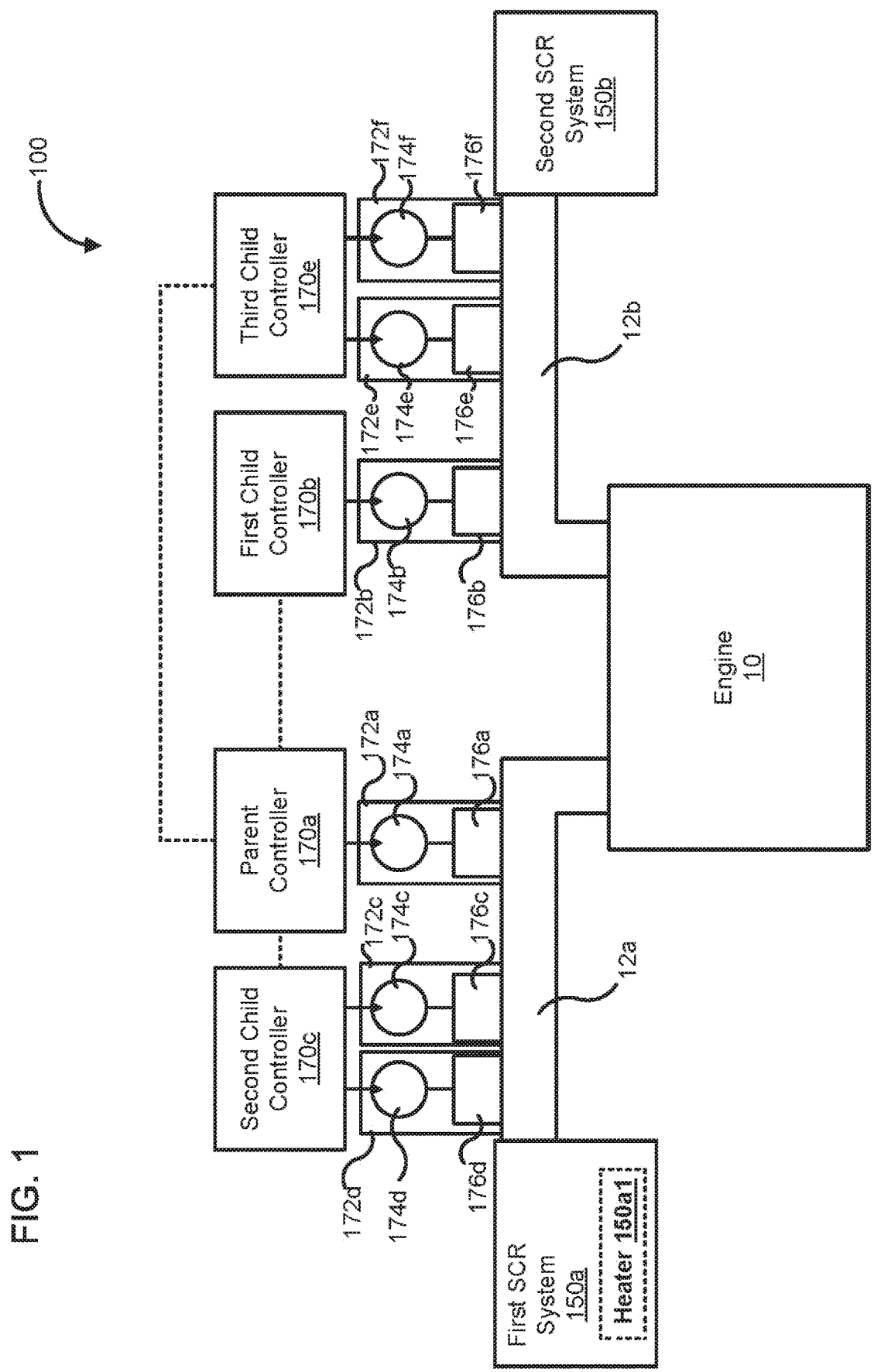
FIG. 1 is a schematic block diagram of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for controlling multiple reductant insertion assemblies included in an aftertreatment system. In various implementations, systems and methods described herein relate to aftertreatment systems including a parent controller and a plurality of child controllers. The parent controller is communicatively coupled to the plurality of child controllers each of which is operative to activate one or more reductant insertion assemblies, and configured to control the operation of each of the one or more reductant insertion assemblies via the plurality of child controllers.

Various embodiments of the systems and methods for controlling multiple reductant insertion assemblies using a parent controller may provide various benefits including: (1) allowing a reduction in the number of electronic components included in the aftertreatment assembly; (2) providing improved control over reductant insertion into multiple banks of the aftertreatment system to more effectively reduce NOx emissions from exhaust gas; and (3) including a plurality of child controllers controlled by the parent controller which allow continuous reductant insertion even in situations where one or more of the child controllers fail.

FIG. 1 is a schematic illustration of an aftertreatment system 100 configured to receive an exhaust gas (e.g., a diesel exhaust gas) generated by an engine 10 (e.g., a diesel engine) and decompose constituents of the exhaust gas. The aftertreatment system 100 includes a first bank 12a, a first SCR system 150a, a second bank 12b, a second SCR system 150b, a first reductant insertion assembly 172a, a second reductant insertion assembly 172b, a third reductant insertion assembly 172c, a fourth reductant insertion assembly 172d, a fifth reductant insertion assembly 172e and a sixth reductant insertion assembly 172f, a parent controller 170a, a first child controller 170b, a second child controller 170c and a third child controller 170e.

The engine 10 can comprise a high horse power engine (e.g., a high horse power diesel engine) such as a marine engine, a railroad engine, an industrial equipment engine, or a genset engine which produces large quantities of exhaust gas. In various embodiments, the engine 10 can have a volumetric capacity of greater than 15 liters and can be used in several off-highway applications. The engine 10 can include an on-road truck engine or an off-road engine. Because of the large quantity of exhaust gas produce by the engine 10, a large quantity of a reductant is used to facilitate decomposition of the exhaust gas as described herein.

The first bank 12a is configured to receive a first portion of the exhaust gas generated by the engine 10. The first bank 12a can include a tube, a pipe or a fluid conduit and is in fluid communication with the first SCR system 150a for delivering the first portion of the exhaust gas to the first SCR system 150a. The second bank 12b is configured to receive a second portion of the exhaust gas and is in fluid communication with the second SCR system 150b to deliver the second portion of the exhaust gas to the second SCR system 150b. While FIG. 1 shows the first bank 12a and the second bank 12b, in other embodiments, the aftertreatment system 100 can include any number of banks and/or SCR systems to receive portions of the exhaust gas and decompose constituents of the exhaust gas.

The first SCR system 150a and the second SCR system 150b (collectively referred to herein as "the SCR systems 150") are configured to receive and decompose constituents (e.g., NOx gases) of the first portion of the exhaust gas (e.g., diesel exhaust gas) and the second portion of the exhaust gas, respectively. The first SCR system 150a is configured to receive a reductant from (e.g., a diesel exhaust fluid such as an aqueous urea solution) from the first reductant insertion assembly 172a, the third reductant insertion assembly 172c and the fourth reductant insertion assembly 172d via the first bank 12a. Furthermore, the second SCR system 150b is configured to receive the reductant from the second reductant insertion assembly 172b, the fifth reductant insertion assembly 172e and the sixth reductant insertion assembly 172f via the second bank 12b. In one embodiment, the first reductant insertion assembly 150a includes a heater 150a1. As such, the parent controller 170a is communicatively coupled with the heater 150a1 so as to control a temperature of the first reductant insertion assembly 150a.

The reductant can be formulated to facilitate decomposition of the constituents (e.g., NOx gases) of the exhaust gas. The SCR systems 150 include at least one catalyst. The at least one catalyst is formulated to selectively reduce constituents of the exhaust gas, for example, NOx gases included in the exhaust gas in the presence of the reductant. Any suitable catalyst can be used such as, for example, platinum, palladium, rhodium, cerium, iron, manganese, copper, vanadium based catalysts (including combinations thereof).

The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalyst. Such washcoat materials can include, for example, aluminum oxide, titanium dioxide, silicon dioxide, any other suitable washcoat material, or a combination thereof. The exhaust gas can flow over and about the catalyst such that any NOx gases included in the exhaust gas are further reduced to yield an exhaust gas which is substantially free of carbon monoxide and NOx gases.

The aftertreatment system 100 can also include other components such as for example oxidation catalysts (e.g., a diesel oxidation catalyst or an ammonia oxidation catalyst), particulate filters (e.g., diesel particulate filters and/or selective catalytic reduction filters) and/or various sensor (e.g., temperature sensors, NOx sensors, pressure sensors and/or particulate matter sensors) positioned along the first bank 12a and the second bank 12b to facilitate reduction of emissions (e.g., NOx gases, CO, unburnt hydrocarbons, particulate matter) and/or measure various operational parameters of the aftertreatment system 100.

The first reductant insertion assembly 172a is fluidly coupled to the first bank 12a. The first reductant insertion assembly 172a includes a first pump 174a and a first injector 176a, configured to receive reductant from a reductant storage tank (not shown) via the first pump 174a and insert the reductant into the first bank 12a. The parent controller 170a is communicatively coupled to the first reductant insertion assembly 172a. The parent controller 170a is configured to instruct the first reductant insertion assembly 172a to insert the reductant into the first bank 12a.

The second reductant insertion assembly 172b is fluidly coupled to the second bank 12b. The second reductant insertion assembly 172b includes a second pump 174b and a second injector 176b configured to receive reductant from the reductant storage tank via the second pump 174b and insert the reductant into the second bank 12b. The first child controller 170b is communicatively coupled to the second reductant insertion assembly 172b. Furthermore, the parent controller 170a is communicatively coupled with the first child controller 170b and configured to instruct the first child controller 170b to command the second reductant insertion assembly 172b to insert the reductant into the second bank 12b.

The third reductant insertion assembly 172c is fluidly coupled to the first bank 12a. The third reductant insertion assembly 172c includes a third pump 174c and a third injector 176c configured to receive reductant from the reductant storage tank via the third pump 174c and deliver the reductant to the first bank 12a. The second child controller 170c is communicatively coupled to the third reductant insertion assembly 172c. Moreover, the parent controller 170a is communicatively coupled to the second child controller 170c and configured to instruct the second child controller 170c to command the third reductant insertion assembly 172c to insert the reductant into the first bank 12a.

The fourth reductant insertion assembly 172d is fluidly coupled to the first bank 12a. The fourth reductant insertion assembly 172d includes a fourth pump 174d and a fourth injector 176d configured to receive reductant from the reductant storage tank via the fourth pump 174d and the deliver the reductant to the first bank 12a. The second child controller 170c is also communicatively coupled to the fourth reductant insertion assembly 172d. Furthermore, the parent controller 170a is also configured to instruct the second child controller 170c to command the fourth reductant insertion assembly 172d to insert the reductant into the first bank 12a.

The fifth reductant insertion assembly 172e is fluidly coupled to the second bank 12b. The fifth reductant insertion assembly 172e includes a fifth pump 174e and a fifth injector 176e configured to receive reductant from the reductant storage tank via the fifth pump 174e and deliver the reductant to the second bank 12b. The third child controller 170e is communicatively coupled to the fifth reductant insertion assembly 172e. Moreover, the parent controller 170a is communicatively coupled to the third child controller 170e and configured to instruct the third child controller 170e to command the fifth reductant insertion assembly 172e to insert the reductant into the second bank 12b.

The sixth reductant insertion assembly 172f is fluidly coupled to the second bank 12b. The sixth reductant insertion assembly 172f includes a sixth pump 174f and a sixth injector 176f configured to receive reductant from the reductant storage tank via the sixth pump 174f and the deliver the reductant to the second bank 12b. The third child controller 170e is also communicatively coupled to the sixth reductant insertion assembly 172f. Furthermore, the parent controller 170a is also configured to instruct the third child controller 170e to command the sixth reductant insertion assembly 172f to insert the reductant into the second bank 12b.

In the above manner, the parent controller 170a serves as a master controller controlling the operation of the first reductant insertion assembly 172a and each of the first child controller 170b, the second child controller 170c and the third child controller 170e. Furthermore, the second child controller 170c and the third child controller 170e each control the operations of two reductant insertion assemblies in response to instructions from the parent controller 170a. Thus, the aftertreatment system 100 centralizes the control of each reductant insertion assembly included in the aftertreatment system 100. This can accelerate performance, resulting in meeting even higher emission goals, and reduce the number of components included in the aftertreatment system 100, thereby reducing manufacturing and maintenance costs.

Each of the parent controller 170a and the first, second and third child controllers 170b, 170c and 170e can include a processor (e.g., a microcontroller) programmed to instruct the corresponding reductant insertion assembly to insert the reductant into the first bank 12a or the second bank 12b. In some embodiments, the parent controller 170a can include a control module or circuitry (e.g., the control circuitry 171a described herein) which is in electrical communication with one or more of the components of the aftertreatment system 100, as described herein, and operable to perform the sensing and control functions described herein. In particular embodiments, the parent controller 170a can also be configured to receive and interpret data from temperature sensors, NOx sensors, oxygen sensors and/or ammonia sensors, each of which can be included in the aftertreatment system 100.

The first child controller 170b can also include a control module or circuitry (e.g., the control circuitry 171b) which is in electrical communication with one or more of the components of the aftertreatment system 100, as described herein and operable to perform the sensing and control functions described herein. Furthermore, the second child controller 170c and/or the third child controller 170e can also include a control module or circuitry (e.g., the control circuitry 171c) which is in electrical communication with one or more of the components of the aftertreatment system 100, as described herein and operable to perform the sensing and control functions described herein.

The parent controller 170a can include look up tables, algorithms or instructions, each of which can be stored on a computer-readable medium included in the parent controller 170a. The instructions or algorithms on the computer-readable medium are executable by a computing device (e.g., the computing device 530) of the parent controller 170a (e.g., the microprocessor) to determine operational parameters of the engine and instruct any of the first child controller 170b, the second child controller 170c and the third child controller 170e to command the corresponding reductant insertion assemblies to insert reductant into the first bank 12a and/or the second bank 12b. In particular embodiments, the parent controller 170a can also include algorithms (e.g., calibration equations) or look up tables, for example to determine operational parameters of the engine 10 and/or the SCR systems 150, and/or interpret the operational parameters for determining the quantity, amount and/or timing of the reductant insertion into the first bank 12a and/or the second bank 12b.

Figure 2:
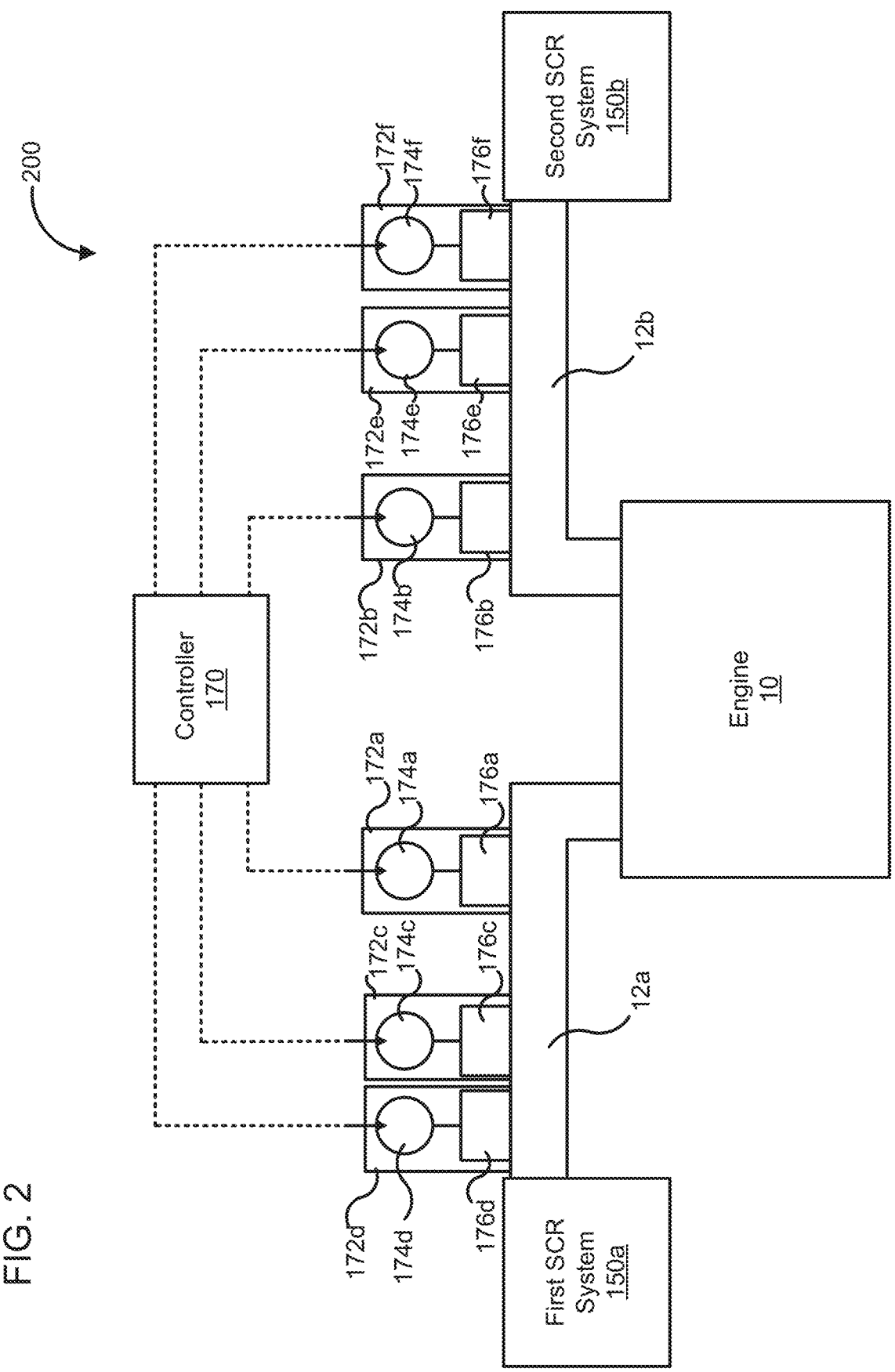
FIG. 2 is a schematic block diagram of another embodiment of an aftertreatment system that includes a single controller configured to control operation of a plurality of reductant insertion assemblies included in the aftertreatment system.

In particular embodiments, a single controller or electronic control circuitry can be used to control the operation of a plurality of reductant insertion assemblies included in an aftertreatment system. For example, FIG. 2 shows an aftertreatment system 200, according to another embodiment. The aftertreatment system 200 is also configured to receive the exhaust gas (e.g., a diesel exhaust gas) generated by the engine 10 (e.g., a diesel engine) and decompose constituents of the exhaust gas. The aftertreatment system 200 includes the first bank 12a, the first SCR system 150a, the second bank 12b, the second SCR system 150b, the first reductant insertion assembly 172a, the second reductant insertion assembly 172b, the third reductant insertion assembly 172c, the fourth reductant insertion assembly 172d, the fifth reductant insertion assembly 172e and the sixth reductant insertion assembly 172f, as described before with respect to the aftertreatment system 100.

Unlike the aftertreatment system 100, however, the aftertreatment system 200 includes a single controller 170 communicatively coupled to each of the first reductant insertion assembly 172a, the second reductant insertion assembly 172b, the third reductant insertion assembly 172c, the fourth reductant insertion assembly 172d, the fifth reductant insertion assembly 172e and the sixth reductant insertion assembly 172f The controller 170 is configured to instruct each of the first reductant insertion assembly 172a, the second reductant insertion assembly 172b and the third reductant insertion assembly 172c to insert the reductant into the first bank 12a of the aftertreatment system 200. Furthermore, the controller 170 is also configured to instruct the fourth reductant insertion assembly 172d, the fifth reductant insertion assembly 172e and the sixth reductant insertion assembly 172f to insert the reductant into the second bank 12b of the aftertreatment system 200. In this manner, only a single controller 170 is used to control the operation of a plurality of reductant insertion assemblies.

In some embodiments, the controller 170 of FIG. 2 may include a parent controller 170, a plurality of child controllers may be communicatively coupled to at least one of the reductant insertion assemblies 172a/f. The parent controller 170 may be configured to instruct each of the plurality of child controllers to insert the reductant into the corresponding one or more reductant insertion assemblies.

Figure 3:
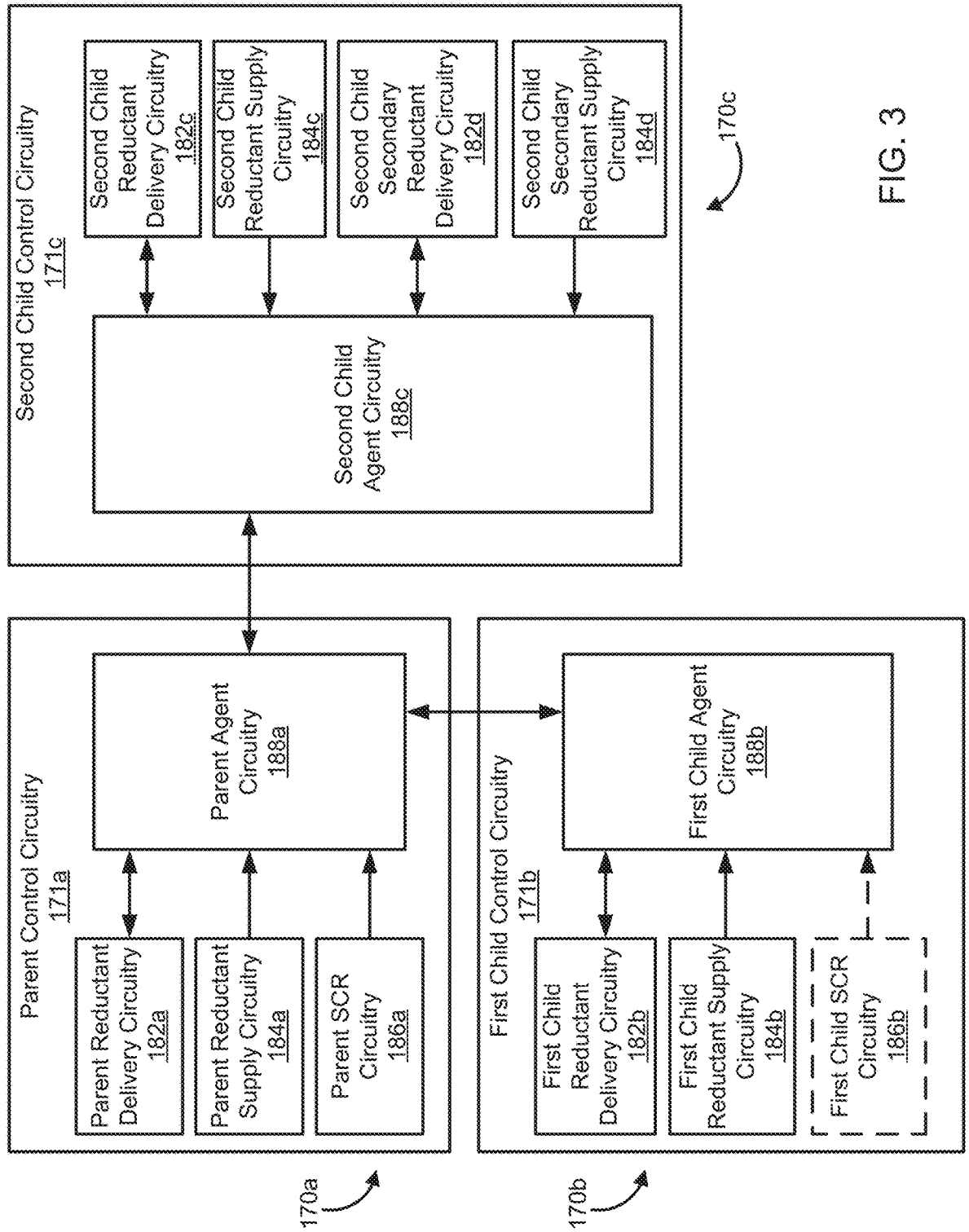
FIG. 3 is a schematic illustration of embodiments of a parent control circuitry which can be included in a parent controller of FIG. 1, a first child control circuitry which can be included in a first child controller of FIG. 1 and a second child control circuitry which can be included in a second child controller of FIG. 1.

In some embodiments, the parent controller 170a can be a system computer of an apparatus or system which includes the aftertreatment system 200 (e.g., a vehicle, a generator set, etc.). Such a computer can include, for example the computing device 530 described in detail herein with respect to FIG. 10. As described before, the parent controller 170a, the first child controller 170b, the second child controller 170c and/or the third child controller 170e can comprise various numbers of control circuitries. For example, FIG. 3 is a schematic block diagram of a parent control circuitry 171a which can be included in the parent controller 170a, a first child control circuitry 171b which can be included in the first child controller 170b, and a second child control circuitry 170c which can be included in the second child controller 170c.

The parent control circuitry 171a includes a parent reductant delivery circuitry 182a, a parent reductant supply circuitry 184a, a parent SCR circuitry 186a and a parent agent circuitry 188a. The parent reductant delivery circuitry 182a is configured to instruct the first reductant insertion assembly 172a to insert the reductant into the first bank 12a. The parent reductant supply circuitry 184a is configured to instruct the first reductant insertion assembly 172a to receive the reductant from the reductant storage tank, for example based on feedback from the parent reductant delivery circuitry 182a. The parent SCR circuitry 186a is configure to determine at least one operational parameter of the SCR systems 150 of the aftertreatment system 100. For example, the parent SCR circuitry 186a can be configured to receive information from NOx sensors, temperature sensors, pressure sensors and/or particulate matter sensors provided on the first bank 12a, the second bank 12b and/or the SCR systems 150 and determine one or more operational parameters such as temperature, NOx conversion efficiency, exhaust gas backpressure etc.

The parent agent circuitry 188a is communicatively coupled with each of the parent reductant delivery circuitry 182a, the parent reductant delivery circuitry 184a and the parent SCR circuitry 186a. The parent agent circuitry 188a can interpret the operational parameters provided by the parent SCR circuitry 186a and determine amount of reductant to be inserted in each of the first bank 12a or the second bank 12b. The parent agent circuitry 188a is configured to command the parent reductant delivery circuitry 182a, and thereby the first reductant insertion assembly 172a to insert reductant into the first bank 12a.

Furthermore, the parent agent circuitry 188a can also be communicatively coupled to a first child controller (e.g., the first child controller 170b or the first child control circuitry 171b), a second child controller (e.g., the second child controller 170c or the second child control circuitry 171c) and/or a third child controller (e.g., the third child controller 170e). In such implementations, the parent agent circuitry 188a can be configured to instruct the first child controller 170b, the second child controller 170c, the third child controller (e.g., the third child controller 170e) or any other child controllers coupled thereto to insert reductant into one or more exhaust banks of an aftertreatment system (e.g., the aftertreatment system 100) via reductant insertion assemblies.

For example, as shown in FIG. 3, the parent agent circuitry 188a is communicatively coupled with the first child controller 170b and configured to instruct the first child controller 170b to command the second reductant insertion assembly 172b to insert the reductant into the second bank 12b. Furthermore, the parent agent circuitry 188a is also communicatively coupled with the second child controller 170c and configured to instruct the second child controller 170c to command the third reductant insertion assembly 172c and/or the fourth reductant insertion assembly 172d to insert the reductant into the first bank 12a. Similarly, the parent agent circuitry 188a can also be coupled with the third child controller 170e and configured to instruct the third child controller 170e to command the fifth reductant insertion assembly 172e and/or the sixth reductant insertion assembly 172 to insert reductant into the second bank 12b.

Also, for example, and as shown in FIG. 3, the first child controller 170b includes the first child control circuitry 171b. The first child control circuitry 171b includes a first child reductant delivery circuitry 182b, a first child reductant supply circuitry 184b and a first child agent circuitry 188b. The first child reductant delivery circuitry 182a is configured to instruct the second reductant insertion assembly 172b to insert the reductant into the second bank 12b. The first child reductant supply circuitry 184b is configured to instruct the second reductant insertion assembly to receive reductant from the reductant storage tank. The first child agent circuitry 188b is communicatively coupled with each of the first child reductant delivery circuitry 182b and the first child reductant supply circuitry 184b.

In various embodiments, the first child control circuitry 171b can also include a first child SCR circuitry 186b. The first child SCR circuitry 186b can be configured to determine at least one operational parameter of the second SCR system 150b of the aftertreatment system 100. For example, the first child SCR circuitry 186b can be configured to receive electronic communication from NOx sensors, temperature sensors, pressure sensors and/or particulate matter sensors provided only on the second bank 12a and/or the second SCR system 150b and determine one or more operational parameters such as temperature, NOx conversion efficiency, exhaust gas backpressure etc. of the second bank 12b and/or second SCR system 150. In such embodiments, the parent SCR circuitry 186a can be configured to monitor the operational parameters of only the first bank 12a and/or the first SCR system 150a.

The parent agent circuitry 188a is communicatively coupled with the first child agent circuitry 188b. The first child agent circuitry 188b is configured to interpret instructions from the parent agent circuitry 188a and activate insertion of the reductant into the second bank 12b through the second insertion assembly 172b via the first child reductant delivery circuitry 182b.

The second child controller 170c includes the second child control circuitry 171c. The third child controller 170e can also include a third child control circuitry which can be substantially similar to the second child control circuitry 171c and is therefore not shown. The second child control circuitry 171c includes a second child reductant delivery circuitry 182c, a second child reductant supply circuitry 184c, a second child secondary reductant delivery circuitry 182d, a second child secondary reductant supply circuitry 184d and a second child agent circuitry 188c.

The second child reductant delivery circuitry 182c is configured to instruct the third reductant insertion assembly 172c to insert the reductant into the first bank 12a. The second child reductant supply circuitry 184c is configured to instruct the third reductant insertion assembly 172c to receive reductant from the reductant storage tank. The second child secondary reductant delivery circuitry 182d is configured to instruct the fourth reductant insertion assembly 172d to insert the reductant into the first bank 12a. The second child secondary reductant supply circuitry 184d is configured to instruct the fourth reductant insertion assembly 172d to receive reductant from the reductant storage tank.

The second child agent circuitry 188c is communicatively coupled with each of the second child reductant delivery circuitry 182c, the second child reductant supply circuitry 184c, the second child secondary reductant delivery circuitry 182d and the second child secondary reductant supply circuitry 184d. The parent agent circuitry 188a is also communicatively coupled to the second child agent circuitry 188c. The second child agent circuitry 188c is configured to interpret instructions from the parent control circuitry 171a and actuate insertion of reductant into the first bank 12a through third insertion assembly 172c via the second child reductant delivery circuitry 182c and/or through the fourth reductant insertion assembly 172d via the second child secondary reductant delivery circuitry 182d.

While not shown, the third controller can include a third child control circuitry in communication with parent agent circuitry 188a. The third child control circuitry can be substantially similar to the second child control circuitry 171c and configured to interpret instructions from the parent agent circuitry 188a to actuate insertion of reductant into the second bank 12a through the fifth insertion assembly 172e and/or through the sixth reductant insertion assembly 172f, as described with respect to the second child control circuitry 171c.

Figure 4:
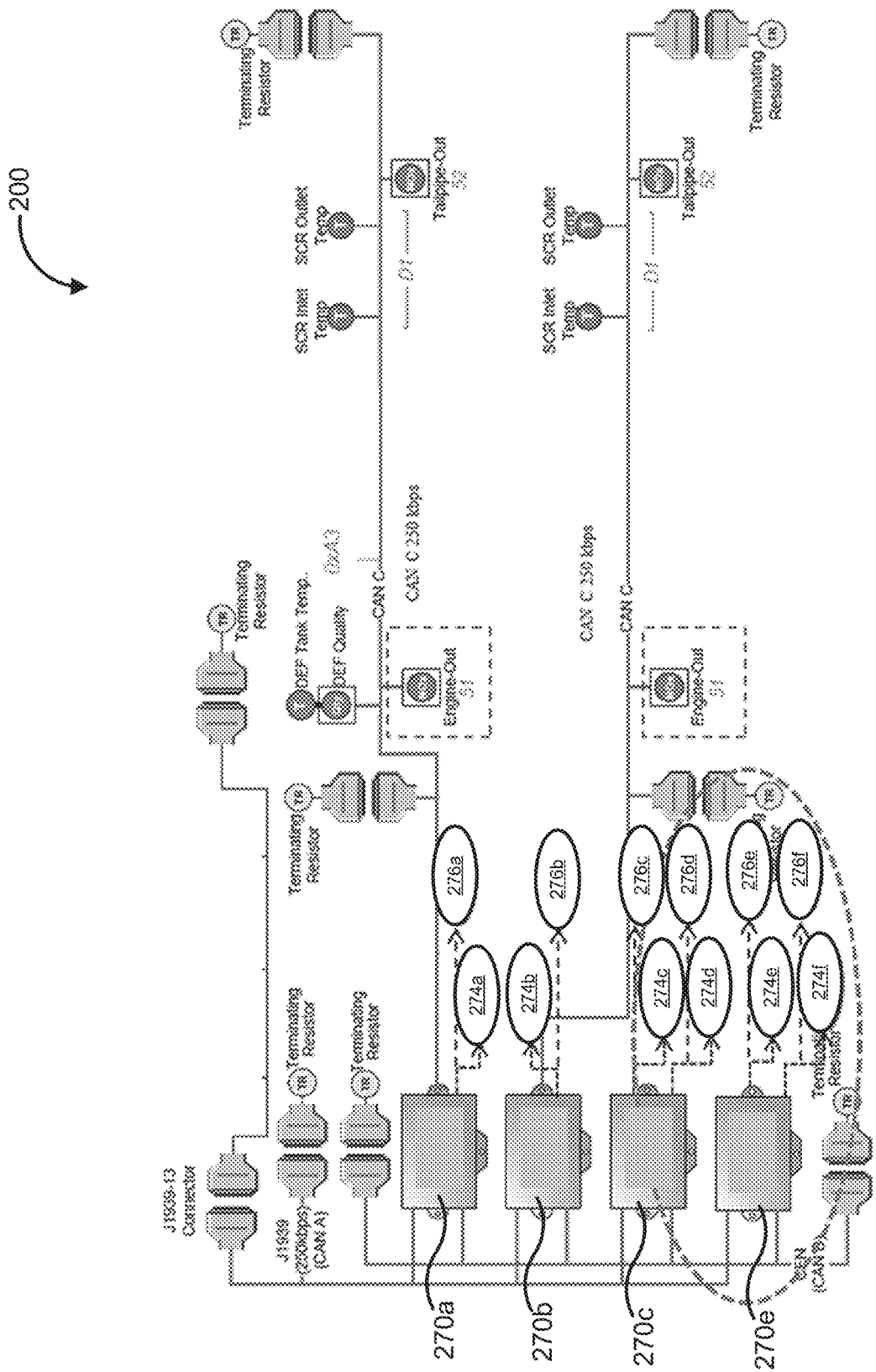
FIG. 4 illustrates a particular embodiment of a network topology of the various controllers included in the aftertreatment system of FIG. 1.

FIG. 4 is a schematic diagram of a network topology 200 of various controllers that can be included an aftertreatment system for treating a diesel exhaust gas, for example the aftertreatment system 100. The aftertreatment system (e.g., the aftertreatment system 100) includes a parent controller 270a, a first child controller 270b, a second child controller 270c and a third child controller 270e.

The parent controller 270a can be substantially similar to the parent controller 170a in structure and function, and the structure and function described herein regarding the parent control 170a also apply to the parent controller 270a. A first pump 274a and a first injector 276a are communicatively coupled to the parent controller 270a and are configured to insert reductant into a first bank of an aftertreatment system (e.g., the first bank 12a of the aftertreatment system 100). The parent controller 270 is also communicatively coupled to a diesel exhaust fluid (DEF) quality sensor, a DEF tank temperature sensor, an engine out NOx sensor, an SCR system inlet temperature sensor, an SCR system outlet temperature sensor and a tailpipe-out NOx sensor, all of which correspond to the first bank of the aftertreatment system (e.g., the first bank 12a and the first SCR system 150a). A plurality of terminating resistors and connectors (e.g., J1939-13 connectors) are also provided to complete the network. While shown as including specific sensors, terminating resistors and connectors, any suitable connectors, terminating resistors and/or sensors can be included in the network.

The first child controller 270b can be substantially similar to the first child controller 170b in structure and function, and the structure and function described herein regarding the first child controller 170b also apply to the first child controller 270b. A second pump 274b and a second injector 276b are communicatively coupled to the first child controller 270b and configured to insert reductant into a second bank of an aftertreatment system (e.g., the second bank 12b of the aftertreatment system 100). The second child controller 270 is also communicatively coupled to an engine out NOx sensor, an SCR system inlet temperature sensor, an SCR system outlet temperature sensor and a tailpipe-out NOx sensor, all of which correspond to the second bank of the aftertreatment system (e.g., the second bank 12b and the second SCR system 150b).

The second child controller 270c can be substantially similar to the second child controller 170c in structure and function, and the structure and function described herein regarding the second child controller 170c also apply to the first child controller 270c. A third pump 274c and a third injector 276c are communicatively coupled to the second child controller 270c and configured to insert reductant into the first bank of the aftertreatment system (e.g., the first bank 12a of the aftertreatment system 100). Furthermore, a fourth pump 274d and a fourth injector 276d are communicatively coupled to the second child controller 170c and also configured to insert reductant into the first bank.

The third child controller 270e can be substantially similar to the third child controller 170e described before herein in structure and function and therefore, and the structure and function described herein regarding the third child controller 170e also apply to the third child controller 270e. A fifth pump 274e and a fifth injector 276e are communicatively coupled to the third child controller 270e and configured to insert reductant into the second bank of the aftertreatment system. Furthermore, a sixth pump 274f and a sixth injector 276f are communicatively coupled to the third child controller 170e and also configured to insert reductant into the second bank.

Figure 5:
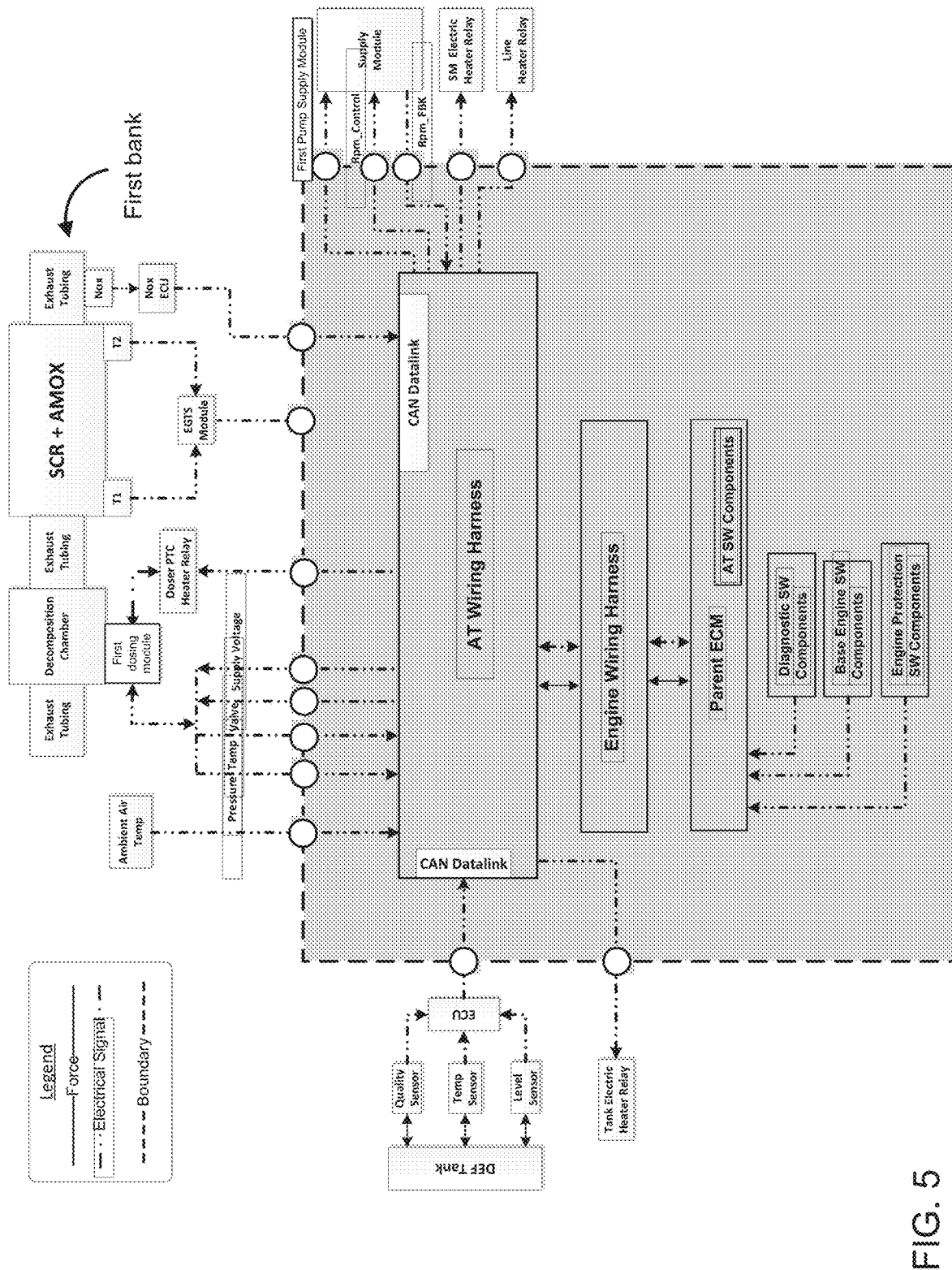
FIG. 5 is one embodiment of boundary diagram of the parent controller of FIG. 1.

FIG. 5 is a schematic illustration of an exemplary embodiment of a boundary diagram of a parent electronic control module (ECM), for example the parent control module or circuitry 171a. The parent ECM is communicatively coupled to various components of a first bank of an aftertreatment system (e.g., the first bank 12a of the aftertreatment system 100) through an engine wiring harness and an aftertreatment (AT) wiring harness. The boundary of the parent ECM is defined by the dotted line. The parent ECM is communicatively coupled to diagnostic software (SW) components, base engine SW components and engine protection SW components and can be configured to interpret electronic communication received therefrom.

The parent ECM is communicatively coupled to a reductant tank or tank electric heater relay and an electronic control unit (ECU) of a DEF tank via a computer aided network (CAN) datalink. The parent ECM can receive and interpret data from the ECU including DEF quality sensor data obtained from a DEF quality sensor communicatively coupled to a DEF tank, DEF temperature sensor data and a DEF tank level sensor data.

The parent SCM is also communicatively coupled to a first pump supply module or circuitry. The first pump supply circuitry includes a supply circuitry including an rpm control and an rpm feedback (FBK) control a supply circuitry heater relay and a supply circuitry line heater relay.

The parent ECM circuitry is also communicatively coupled to components included in the first bank of the aftertreatment system (e.g., the first bank 12a of the aftertreatment system 100) which includes an SCR system (e.g., the first SCR system 150a), an ammonia oxidation catalyst (AMOX) a decomposition chamber, a first dosing module or injector, and exhaust tubing. The parent ECM is configured to receive and interpret information corresponding to ambient air temperature, and SCR system temperature measured by a first temperature sensor T1 located at an inlet of the SCR system and a second temperature sensor T2 located at an outlet of the SCR system via an exhaust gas temperature sensing (EGTS) module or circuitry. The parent ECM circuitry also receives and interprets data from a NOx sensor positioned at an outlet of the SCR system via a NOx ECU.

Furthermore, the parent ECM is communicatively coupled to the first dosing circuitry and configured to monitor pressure, temperature and supply voltage corresponding to the first dosing circuitry. The parent ECM also communicates with a doser heater relay to control a temperature of the first dosing circuitry. The parent ECM is configured to instruct the first pump supply circuitry and the first dosing circuitry, which together can be included in a first reductant insertion assembly (e.g., the reductant insertion assembly 172a) to insert DEF or any other reductant into the decomposition chamber included in the first bank of the aftertreatment system.

Figure 6:
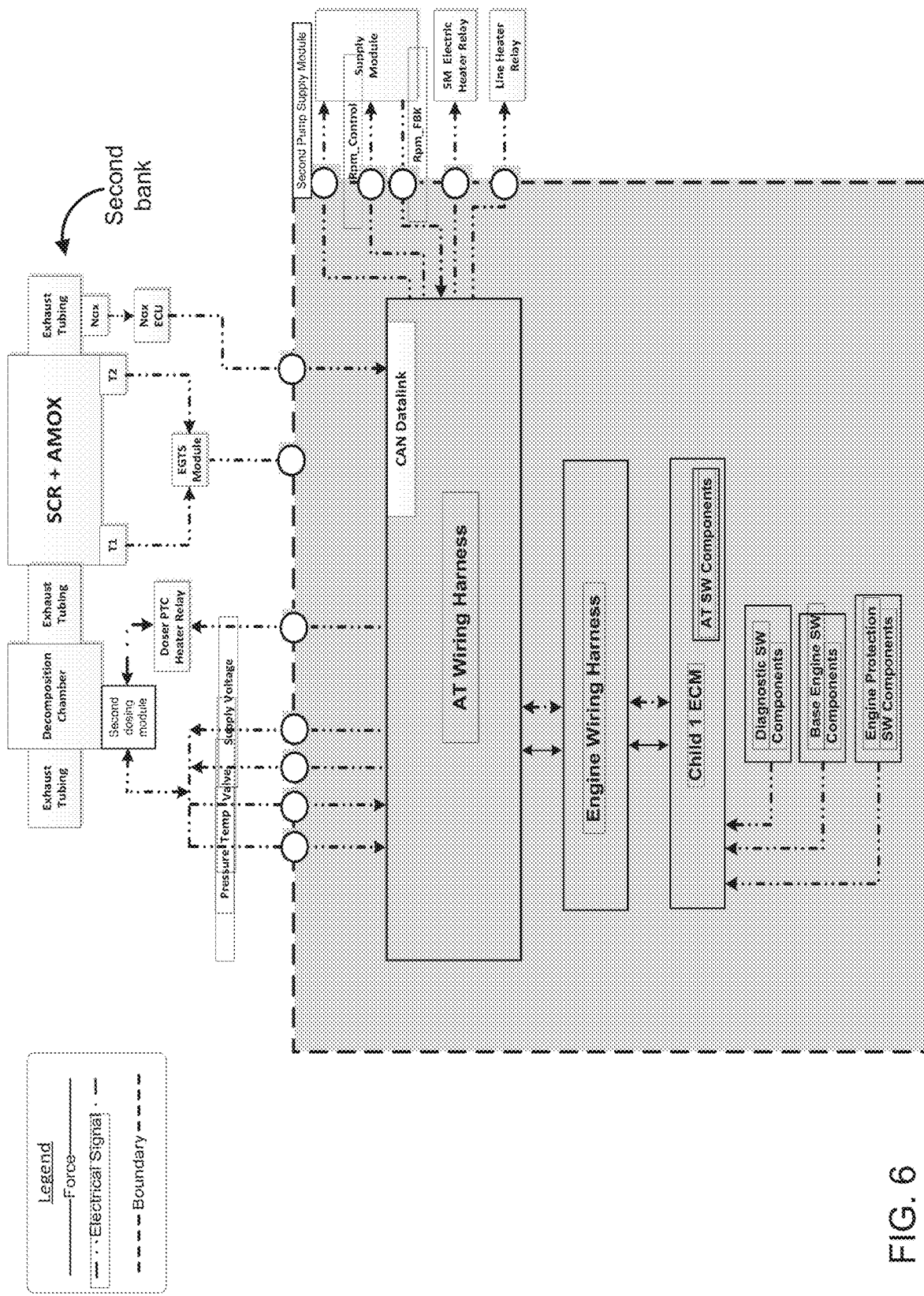
FIG. 6 is another embodiment of a boundary diagram of the first child controller of FIG. 1.

FIG. 6 is a schematic illustration of an exemplary embodiment of a boundary diagram of a first child ECM (child 1 ECM), for example the first child control circuitry 171b. The child 1 ECM boundary diagram is similar to the parent ECM boundary diagram, except that the child 1 ECM is not communicatively coupled with the reductant tank or tank electric heater relay and the ECU of the DEF tank. The child 1 ECM is communicatively coupled to various components of a second bank of an aftertreatment system, for example the aftertreatment system 100 through the engine wiring harness and the AT wiring harness. The child 1 ECM is communicatively coupled to AT SW components, diagnostic SW components, base engine SW components and engine protection SW components, and can be configured to interpret electronic communication received therefrom.

The child 1 ECM is also communicatively coupled to a second pump supply module or circuitry. The second pump supply circuitry includes a supply circuitry including an rpm control and an rpm feedback (FBK) control, a supply circuitry heater relay and a supply circuitry line heater relay.

The child 1 ECM circuitry is also communicatively coupled to components included in the second bank of the aftertreatment system (e.g., the second bank 12b of the aftertreatment system 100) which also includes an SCR system (e.g., the second SCR system 150b), an ammonia oxidation catalyst (AMOX) a decomposition chamber, a second dosing circuitry or injector, and exhaust tubing. The child 1 ECM is configured to receive and interpret information corresponding to ambient air temperature, a temperature sensor T1 located at an inlet of the SCR system and a second temperature sensor T2 located at an outlet of the SCR system via an exhaust gas temperature sensing (EGTS) circuitry. The child 1 ECM circuitry also receives and interprets data from a NOx sensor positioned at an outlet of the SCR system via a NOx ECU.

Furthermore, the child 1 ECM is communicatively coupled to the second dosing circuitry and configured to monitor pressure, temperature and supply voltage corresponding to the dosing circuitry. The child 1 ECM also communicates with a doser heater relay to control a temperature of the second dosing circuitry. The parent ECM is configured to instruct the second pump supply circuitry and the second dosing circuitry, which together can be included in a second reductant insertion assembly (e.g., the second reductant insertion assembly 172*a*) to insert DEF or any other reductant into the decomposition chamber included in the second bank of the aftertreatment system.

Figure 7:
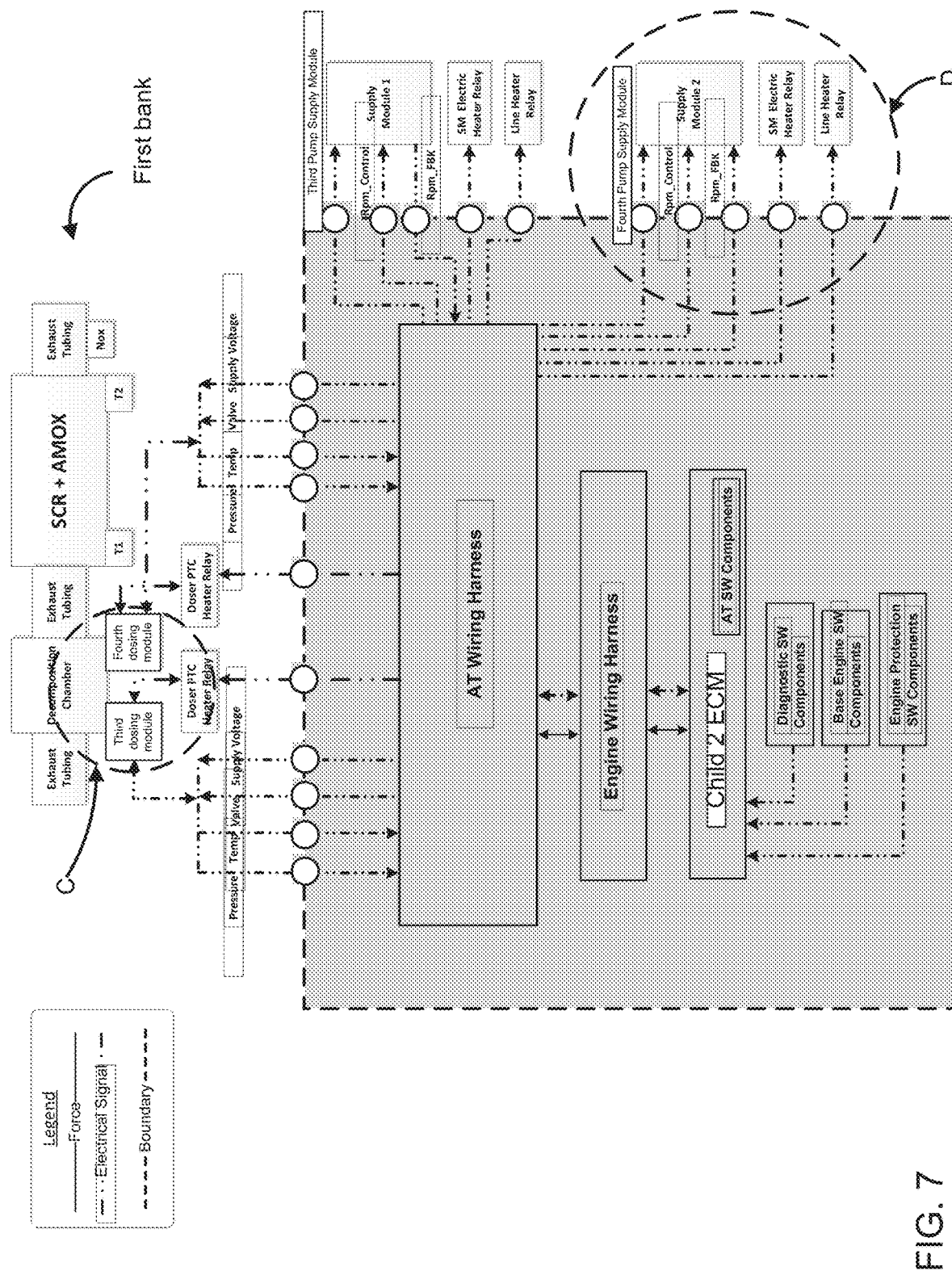
FIG. 7 is yet another embodiment of a boundary diagram of the second child controller of FIG. 1.

FIG. 7 is a schematic illustration of an exemplary embodiment of a boundary diagram of a second child ECM (child 2 ECM), for example the second child control circuitry 171*c*. The child 2 ECM boundary diagram is similar to the child 1 ECM boundary diagram, except the child 2 ECM is communicatively coupled to two dosing circuitries and two supply circuitries. The child 2 ECM is communicatively coupled to various components of a first bank of an aftertreatment system (e.g., the first bank 12*a* of the aftertreatment system 100) through the engine wiring harness and the AT wiring harness. The child 2 ECM is communicatively coupled to AT SW components, diagnostic SW components, base engine SW components and engine protection SW components and can be configured to interpret electronic communication received therefrom.

The child 2 ECM is communicatively coupled to a third pump supply module or circuitry. The third pump supply circuitry includes a first supply circuitry (supply circuitry 1) including an rpm control and an rpm feedback (FBK) control, a supply circuitry heater relay and a supply circuitry line heater relay. Furthermore, the child 2 SCM is also communicatively coupled to a fourth pump supply module or circuitry. The fourth pump supply circuitry includes a second supply circuitry (supply circuitry 2) including an rpm control and an rpm feedback (FBK) control, a supply circuitry heater relay and a supply circuitry line heater relay.

Furthermore. the child 2 ECM circuitry is communicatively coupled to components included in the first bank of the aftertreatment system (e.g., the second bank 12*b* of the aftertreatment system 100) which includes an SCR system (e.g., the second SCR system 150*b*), an ammonia oxidation catalyst (AMOX) a decomposition chamber, a third dosing circuitry, a fourth dosing circuitry and exhaust tubing.

The child 2 ECM is communicatively coupled to the third dosing circuitry and configured to monitor pressure, temperature and supply voltage corresponding to the third dosing circuitry. The child 2 ECM also communicates with a doser heater relay to control a temperature of the second dosing circuitry. The child 2 ECM is configured to instruct the third pump supply circuitry and the third dosing circuitry, which together can be included in a third reductant insertion assembly (e.g., the third reductant insertion assembly 172*c*), to insert DEF or any other reductant into the decomposition chamber included in the first bank of the aftertreatment system.

Furthermore, the child 2 ECM is also communicatively coupled to the fourth dosing circuitry and configured to monitor pressure, temperature and supply voltage corresponding to the fourth dosing circuitry. The child 2 ECM also communicates with a doser heater relay to control a temperature of the fourth dosing circuitry. The child 2 ECM is configured to instruct the fourth pump supply circuitry and the fourth dosing circuitry, which together can be included in a fourth reductant insertion assembly (e.g., the fourth reductant insertion assembly 172*d*), to insert DEF or any other reductant into the decomposition chamber included in the first bank of the aftertreatment system.

Figure 8:
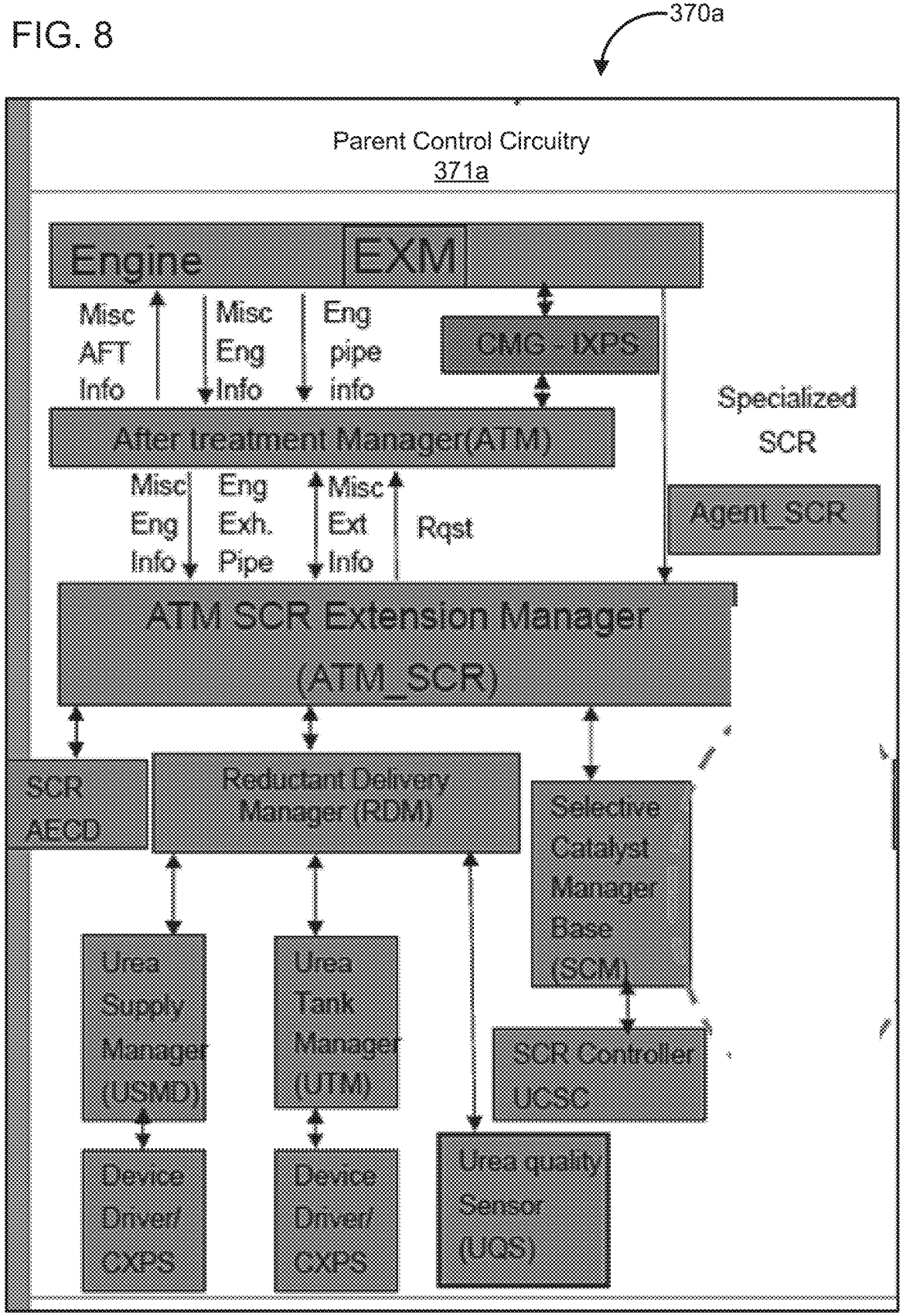
FIG. 8 is a block diagram of another embodiment of a parent control circuitry.

FIG. 8 is a schematic block diagram of another embodiment of a parent control circuitry 371*a* which can be included in a controller, for example the controller 170*a* or 270*a*. The parent control circuitry 371*a* includes an engine exchange module or circuitry which provides information corresponding to operational parameters of an engine (Misc Eng Info) and exhaust gas generated by the engine (Eng pipe info). An aftertreatment manager (ATM) or circuitry is also included which communicates miscellaneous aftertreatment operational parameters (Misc AFT info) with the engine exchange circuitry and an ATM extension manager or circuitry.

A SCR Auxiliary Emission Control Device (AECD), a reductant delivery manager or circuitry and a selective catalyst manager (SCM) base or circuitry are communicatively coupled to the ATM SCR extension manager. A urea supply manager is communicatively coupled to the reductant delivery manager and a device driver. A urea tank manager or circuitry is also communicatively coupled to the reductant delivery manager and a device driver. A urea quality sensor is also communicatively coupled to the reductant delivery manager. Furthermore, a SCR controller is communicatively coupled to the SCM base.

The parent control circuitry 371*a* includes a parent agent SCR module or circuitry. The parent agent SCR circuitry is configured to instruct the reductant delivery manager to insert reductant into an aftertreatment system (e.g., into the first bank 12*a* of the aftertreatment system 100). Furthermore, the parent agent SCR circuitry can also be communicatively coupled to a first child controller (e.g., the first child controller 170*b* or the first child control circuitry 171*b*), a second child controller (e.g., the second child controller 170*c* or the second child control circuitry 171*c*) and/or a third child controller (e.g., the third child controller 170*e*).

Figure 9:
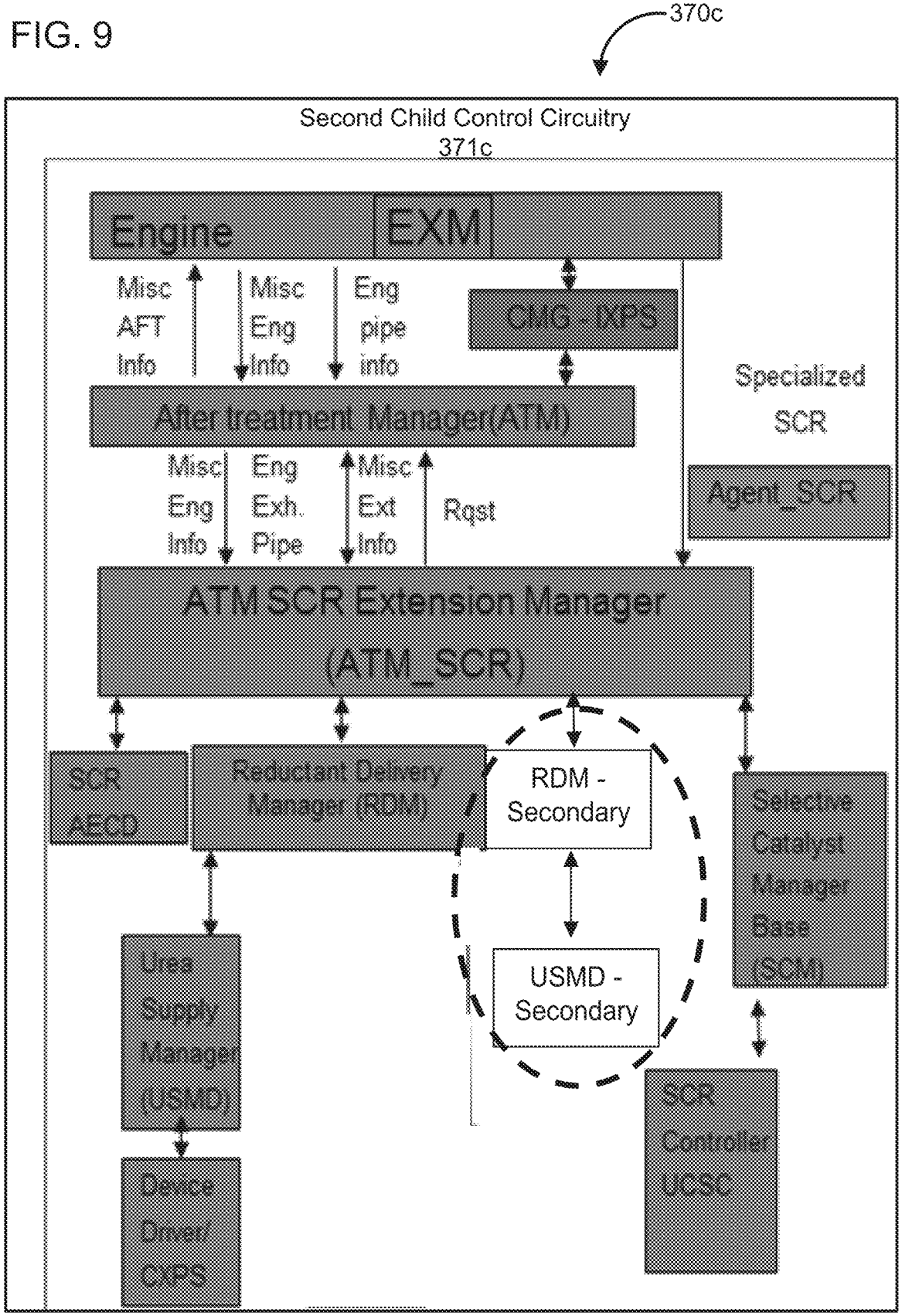
FIG. 9 is a block diagram of still another embodiment of the second child control circuitry.

FIG. 9 is a schematic block diagram of still another embodiment of a second child control module or circuitry 371*c* which can be included in a controller, for example the second child controller 170*c* or 270*c*. The second child control circuitry 371*c* includes an engine exchange module or circuitry which provides information corresponding to operational parameters of an engine (Misc Eng Info) and exhaust gas generated by the engine (Eng pipe info). An aftertreatment manager (ATM) or circuitry is also included which communicates miscellaneous aftertreatment operational parameters (Misc AFT info) with the engine exchange circuitry and an ATM extension manager or circuitry.

An SCR AECD, a reductant delivery manager (RDM) or circuitry and a selective catalyst manager (SCM) base or circuitry is communicatively coupled to the ATM SCR extension manager. A urea supply manager (USMD) is communicatively coupled to the reductant delivery manager and a device driver. Furthermore, a SCR controller is communicatively coupled to the SCM base. Additionally, the second child control circuitry 371*c* includes a secondary RDM communicatively coupled to the ATM SCR Extension Manager and a secondary USMD communicatively coupled to the secondary RDM.

The second child control circuitry 371*c* includes a second child agent SCR circuitry (agent_SCR). The second child agent SCR circuitry can be communicatively coupled to the parent agent SCR circuitry to interpret instructions from the parent agent SCR circuitry and command the reductant delivery manager and/or the secondary reductant delivery manager to insert reductant into an aftertreatment system (e.g., into the first bank 12*a* of the aftertreatment system 100).

Figure 10:
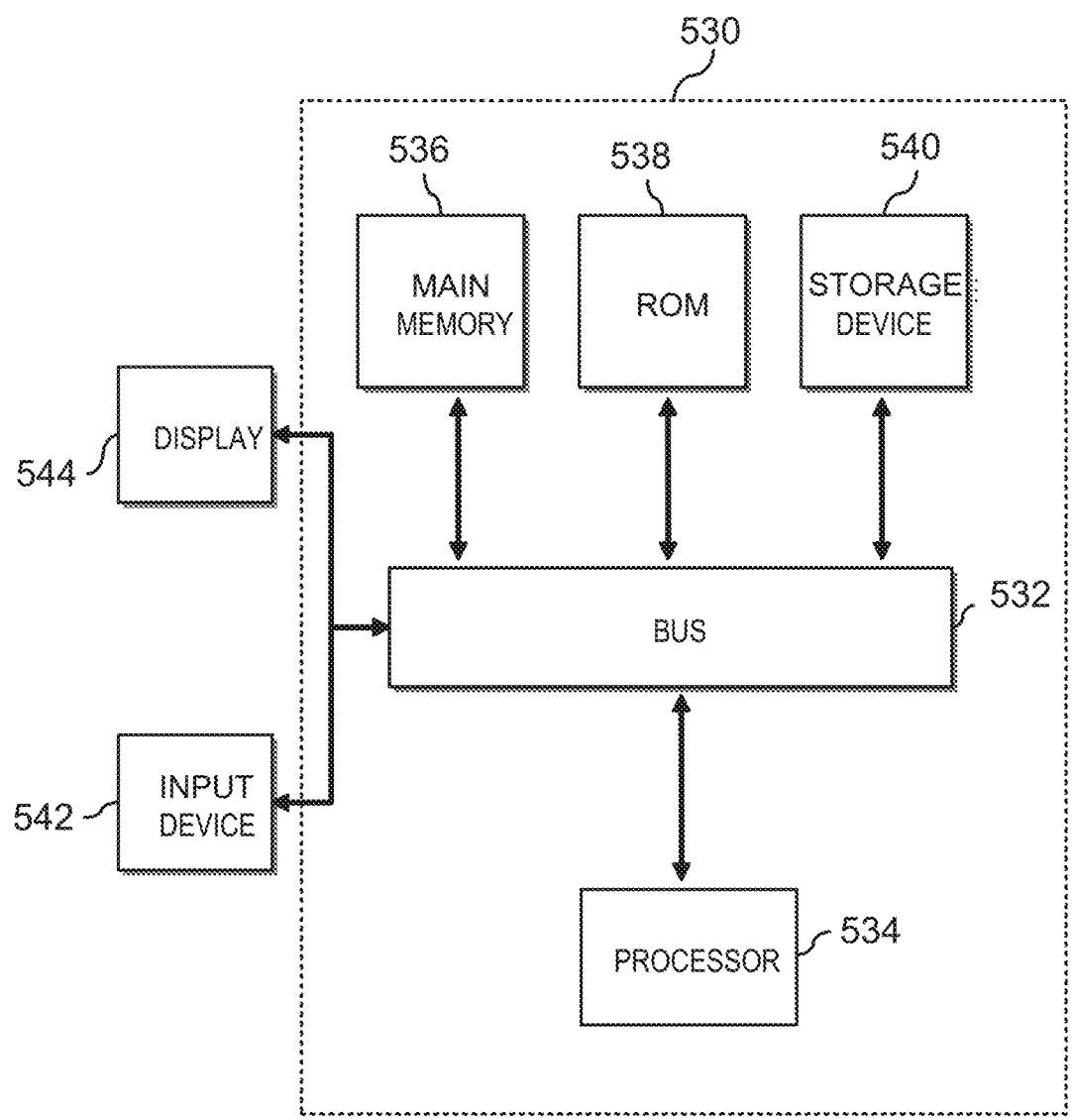
FIG. 10 is a schematic block diagram of a computing device which can be used as any of the parent controller, the first child controller, the second child controller or a third child controller described herein.

FIG. 10 is a block diagram of a computing device 530 in accordance with an illustrative implementation. The computing device can be used to perform any of the methods or the processes described herein. In some embodiments, the parent controller 170*a* or 270*a*, or any of the child controllers described herein can include the computing device 530. The computing device 530 includes a bus 532 or other communication component for communicating information. The computing device 530 can also include one or more processors 534 or processing circuits coupled to the bus for processing information.

The computing device 530 also includes main memory 536, such as a random access memory (RAM) or other dynamic storage device, coupled to the bus 532 for storing information, and instructions to be executed by the processor 534. Main memory 536 can also be used for storing position information, temporary variables, or other intermediate information during execution of instructions by the processor 534. The computing device 530 may further include a read only memory (ROM) 538 or other static storage device coupled to the bus 532 for storing static information and instructions for the processor 534. A storage device 540, such as a solid-state device, magnetic disk or optical disk, is coupled to the bus 532 for persistently storing information and instructions.

The computing device 530 may be coupled via the bus 532 to a display 535, such as a liquid crystal display, or active matrix display, for displaying information to a user. An input device 542, such as a keyboard or alphanumeric pad, may be coupled to the bus 532 for communicating information and command selections to the processor 534. In another implementation, the input device 542 has a touch screen display 544.

According to various implementations, the processes and methods described herein can be implemented by the computing device 530 in response to the processor 534 executing an arrangement of instructions contained in main memory 536 (e.g., the operations of the method 300). Such instructions can be read into main memory 536 from another non-transitory computer-readable medium, such as the storage device 540. Execution of the arrangement of instructions contained in main memory 536 causes the computing device 530 to perform the illustrative processes described herein. One or more processors in a multi-processing arrangement may also be employed to execute the instructions contained in main memory 536. In alternative implementations, hard-wired circuitry may be used in place of or in combination with software instructions to effect illustrative implementations. Thus, implementations are not limited to any specific combination of hardware circuitry and software.

Although an example computing device has been described in FIG. 10, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules or circuitries of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Many of the functional units described in this specification have been labeled as modules or circuitries, in order to more particularly emphasize their implementation independence. For example, a circuitry may be implemented as a hardware circuit comprising custom VLSI circuits or gate arrays, off-the-shelf semiconductors such as logic chips, transistors, or other discrete components. A circuitry may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
    a first conduit configured to receive a first portion of an exhaust gas produced by an engine;
    a second conduit configured to receive a second portion of the exhaust gas produced by the engine;
    a first reductant insertion assembly fluidly coupled to the first conduit, the first reductant insertion assembly comprising a first pump, and a first injector configured to inject reductant directly into the first conduit;
    a parent controller communicatively coupled to the first reductant insertion assembly;
    a second reductant insertion assembly fluidly coupled to the second conduit, the second reductant insertion assembly comprising a second pump, and a second injector configured to inject reductant directly into the second conduit;
    a first child controller communicatively coupled to the second reductant insertion assembly;
    a third reductant insertion assembly fluidly coupled to the first conduit, the third reductant insertion assembly comprising a third pump, and a third injector configured to inject reductant directly into the first conduit; and a second child controller communicatively coupled to the third reductant insertion assembly;

wherein the parent controller is configured to:
directly instruct the first reductant insertion assembly to insert reductant into the first conduit,
instruct the first child controller to command the second reductant insertion assembly to insert reductant into the second conduit, and
instruct the second child controller to command the third reductant insertion assembly to insert reductant into the first conduit.

2. The aftertreatment system of claim 1, wherein the first reductant insertion assembly comprises a heater, and the wherein the parent controller is communicatively coupled with the heater so as to control a temperature of the first reductant insertion assembly.

3. The aftertreatment system of claim 1, further comprising:
a fourth reductant insertion assembly fluidly coupled to the first conduit, the fourth reductant insertion assembly comprising a fourth pump, and a fourth injector configured to inject reductant directly into the first conduit,
wherein the second child controller is also communicatively coupled to the fourth reductant insertion assembly, and
wherein the parent controller is further configured to instruct the second child controller to command the fourth reductant insertion assembly to insert reductant into the first conduit.

4. The aftertreatment system of claim 3, further comprising:
a fifth reductant insertion assembly fluidly coupled to the second conduit, the fifth reductant insertion assembly comprising a fifth pump, and a fifth injector configured to inject reductant directly into the second conduit; and
a third child controller communicatively coupled to the fifth reductant insertion assembly;
wherein the parent controller is further configured to instruct the third child controller to command the fifth reductant insertion assembly to insert reductant into the second conduit.

5. The after treatment system of claim 4, further comprising:
a sixth reductant insertion assembly fluidly coupled to the second conduit, the sixth reductant insertion assembly comprising a sixth pump, and a sixth injector configured to inject reductant directly into the second conduit,
wherein the third child controller is also communicatively coupled to the sixth reductant insertion assembly, and
wherein the parent controller is further configured to instruct the third child controller to command the sixth reductant insertion assembly to insert reductant into the second conduit.

6. The aftertreatment system of claim 3,
wherein the parent controller comprises a parent control circuitry including:
a parent reductant delivery circuitry configured to instruct the first reductant insertion assembly to insert reductant into the first conduit; and
a parent agent circuitry communicatively coupled with the parent reductant delivery circuitry the parent agent circuitry further communicatively coupled with the first child controller and the second child controller, and configured to:
instruct the first child controller to command the second reductant insertion assembly to insert reductant into the second conduit, and
instruct the second child controller to command each of the third reductant insertion assembly and the fourth reductant insertion assembly to insert reductant into the first conduit.

7. The aftertreatment system of claim 6,
wherein the parent control circuitry further comprises:
a parent reductant supply circuitry configured to instruct the first reductant insertion assembly to receive reductant from a reductant storage tank; and
a parent selective catalytic reduction circuitry configured to determine at least one operational parameter of the aftertreatment system,
wherein the parent agent circuitry is communicatively coupled with each of the parent reductant supply circuitry and the parent selective catalytic reduction circuitry.

8. The aftertreatment system of claim 7, wherein the parent agent circuitry is configured to interpret the at least one operational parameter so as to determine an amount of reductant to be inserted into the first conduit and the second conduit.

9. The aftertreatment system of claim 7, wherein the at least one operational parameter includes at least one of a temperature of the exhaust gas, a NOx conversion efficiency of at least one selective catalytic reduction system of the aftertreatment system, and an exhaust gas backpressure.

10. The aftertreatment system of claim 6,
wherein the first child controller comprises a first child control circuitry including:
a first child reductant delivery circuitry configured to instruct the second reductant insertion assembly to insert reductant into the second conduit,
a first child reductant supply circuitry configured to instruct the second reductant insertion assembly to receive reductant from the reductant storage tank, and
a first child agent circuitry communicatively coupled with each of the first child reductant delivery circuitry and the first child reductant supply circuitry,
wherein the parent agent circuitry is communicatively coupled with the first child agent circuitry, the first child agent circuitry configured to interpret instructions from the parent agent circuitry and actuate insertion of reductant into the second conduit through the second insertion assembly via the first child reductant delivery circuitry.

11. The aftertreatment system of claim 10,
wherein the second child controller comprises a second child control circuitry including:
a second child reductant delivery circuitry configured to instruct the third reductant insertion assembly to insert reductant into the first conduit,
a second child reductant supply circuitry configured to instruct the third reductant insertion assembly to receive reductant from the reductant storage tank,
a second child secondary reductant delivery circuitry configured to instruct the fourth reductant insertion assembly to insert reductant into the first conduit,
a second child secondary reductant supply circuitry configured to instruct the fourth reductant insertion assembly to receive reductant from the reductant storage tank, and
a second child agent circuitry communicatively coupled with each of the second child reductant delivery circuitry, the second child reductant supply circuitry, the second child secondary reductant delivery circuitry and the second child secondary reductant supply circuitry, wherein the parent agent circuitry is communicatively coupled with the second child agent circuitry, the second child agent circuitry configured to interpret instructions from the parent agent circuitry and actuate insertion of reductant into the first conduit through at least one of:

the third insertion assembly via the second child reductant delivery circuitry, and the fourth reductant insertion assembly via the second child secondary reductant delivery circuitry.

12. A control circuitry system for controlling insertion of a reductant into an aftertreatment system, the aftertreatment system comprising a first conduit configured to receive a first portion of an exhaust gas produced by an engine; a second conduit configured to receive a second portion of the exhaust gas produced by the engine; a first reductant insertion assembly fluidly coupled to the first conduit, the first reductant insertion assembly comprising a first pump, and a first injector configured to inject reductant directly into the first conduit; a second reductant insertion assembly fluidly coupled to the second conduit, the second reductant insertion assembly comprising a second pump, and a second injector configured to inject reductant directly into the second conduit; and a third reductant insertion assembly fluidly coupled to the first conduit, the third reductant insertion assembly comprising a third pump, and a third injector configured to inject reductant directly into the first conduit and a plurality of reductant insertion assemblies fluidly coupled to the first conduit and the second conduit, the control circuitry system comprising:

a parent controller structured to be communicatively coupled to the first reductant insertion assembly of the plurality of reductant insertion assemblies fluidly coupled to the first conduit;

a first child controller structured to be communicatively coupled to the second reductant insertion assembly of the plurality of reductant insertion assemblies fluidly coupled to the second conduit; and a second child controller structured to be communicatively coupled to the third reductant insertion assembly of the plurality of reductant insertion assemblies fluidly coupled to the first conduit, wherein the parent controller is configured to:

directly instruct the first reductant insertion assembly to insert reductant into the first conduit, instruct the first child controller to command the second reductant insertion assembly to insert reductant into the second conduit, and instruct the second child controller to command the third reductant insertion assembly to insert reductant into the first conduit.

13. The control circuitry of claim 12, wherein the second child controller is structured to be communicatively coupled to a fourth reductant insertion assembly of the plurality of reductant insertion assemblies fluidly coupled to the first conduit, the fourth reductant insertion assembly comprising a fourth pump, and a fourth injector configured to inject reductant directly into the first conduit, and wherein the parent controller is further configured to instruct the second child controller to command the fourth reductant insertion assembly to insert reductant into the first conduit.

14. The control circuitry of claim 13, further comprising:

a third child controller structured to be communicatively coupled to a fifth reductant insertion assembly of the plurality of reductant insertion assemblies fluidly coupled to the second conduit, the fifth reductant insertion assembly comprising a fifth pump, and a fifth injector configured to inject reductant directly into the second conduit, and wherein the parent controller is further configured to instruct the third child controller to command the fifth reductant insertion assembly to insert reductant into the second conduit.

15. The control circuitry of claim 14, wherein the third child controller is further structured to be communicatively coupled to a sixth reductant insertion assembly of the plurality of reductant insertion assemblies fluidly coupled to the second conduit, the sixth reductant insertion assembly comprising a sixth pump, and a sixth injector configured to inject reductant directly into the second conduit, and wherein the parent controller is further configured to instruct the third child controller to command the sixth reductant insertion assembly to insert reductant into the second conduit.

16. The control circuitry of claim 12, wherein the parent controller comprises a parent control circuitry comprising:

a parent reductant delivery circuitry configured to instruct the first reductant insertion assembly to insert reductant into the first conduit; and a parent agent circuitry communicatively coupled with the parent reductant delivery circuitry, the first child controller and the second child controller, and configured to:

instruct the first child controller to command the second reductant insertion assembly to insert reductant into the second conduit, and instruct the second child controller to command each of the third reductant insertion assembly and the fourth reductant insertion assembly to insert reductant into the first conduit.

17. The control circuitry of claim 16, wherein the parent control circuitry further comprises:

a parent reductant supply circuitry configured to instruct the first reductant insertion assembly to receive reductant from a reductant storage tank, and a parent selective catalytic reduction circuitry configured to determine at least one operational parameter of the aftertreatment system, wherein the parent agent circuitry is communicatively coupled with each of the parent reductant supply circuitry and the parent selective catalytic reduction circuitry.

18. The control circuitry of claim 17, wherein the parent agent circuitry is configured to interpret the at least one operational parameter so as to determine an amount of reductant to be inserted into the first conduit and the second conduit.

19. The control circuitry of claim 17, wherein the at least one operational parameter includes at least one of a temperature of the exhaust gas, a NOx conversion efficiency of at least one selective catalytic reduction system of the aftertreatment system, and an exhaust gas backpressure.

20. The control circuitry of claim 16, wherein the first child controller comprises a first child control circuitry comprising:

a first child reductant delivery circuitry configured to instruct the second reductant insertion assembly to insert reductant into the second conduit;

a first child reductant supply circuitry configured to instruct the second reductant insertion assembly to receive reductant from the reductant storage tank; and a first child agent circuitry communicatively coupled with each of the first child reductant delivery circuitry and the first child reductant supply circuitry, wherein the parent agent circuitry is communicatively coupled with the first child agent circuitry, the first child agent circuitry configured to interpret instructions from the parent agent circuitry and actuate insertion of reductant into the second conduit through the second insertion assembly via the first child reductant delivery circuitry.

21. The control circuitry of claim 20, wherein the second child controller comprises a second child control circuitry including:

a second child reductant delivery circuitry configured to instruct the third reductant insertion assembly to insert reductant into the first conduit, a second child reductant supply circuitry configured to instruct the third reductant insertion assembly to receive reductant from the reductant storage tank, a second child secondary reductant delivery circuitry configured to instruct the fourth reductant insertion assembly to insert reductant into the first conduit, a second child secondary reductant supply circuitry configured to instruct the fourth reductant insertion assembly to receive reductant from the reductant storage tank, and a second child agent circuitry communicatively coupled with each of the second child reductant delivery circuitry, the second child reductant supply circuitry, the second child secondary reductant delivery circuitry and the second child secondary reductant supply circuitry, wherein the parent agent circuitry is communicatively coupled with the second child agent circuitry, the second child agent circuitry configured to interpret instructions from the parent agent circuitry and actuate insertion of reductant into the first conduit through at least one of:

the third insertion assembly via the second child reductant delivery circuitry, and the fourth reductant insertion assembly via the second child secondary reductant delivery circuitry.

* * * * *